Sept. 21, 1971  E. W. PEARSON  3,606,671
METHOD AND APPARATUS FOR FORMING POLE-LIKE STRUCTURES
Filed July 10, 1968  2 Sheets-Sheet 1
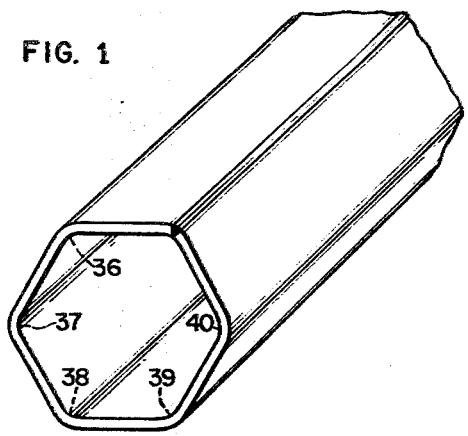
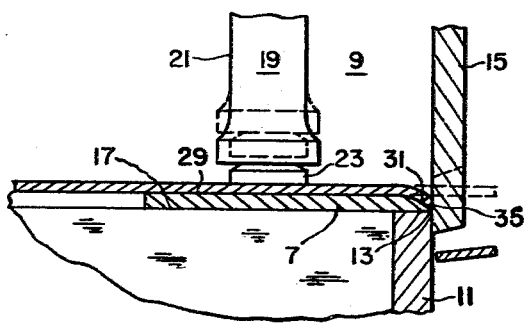
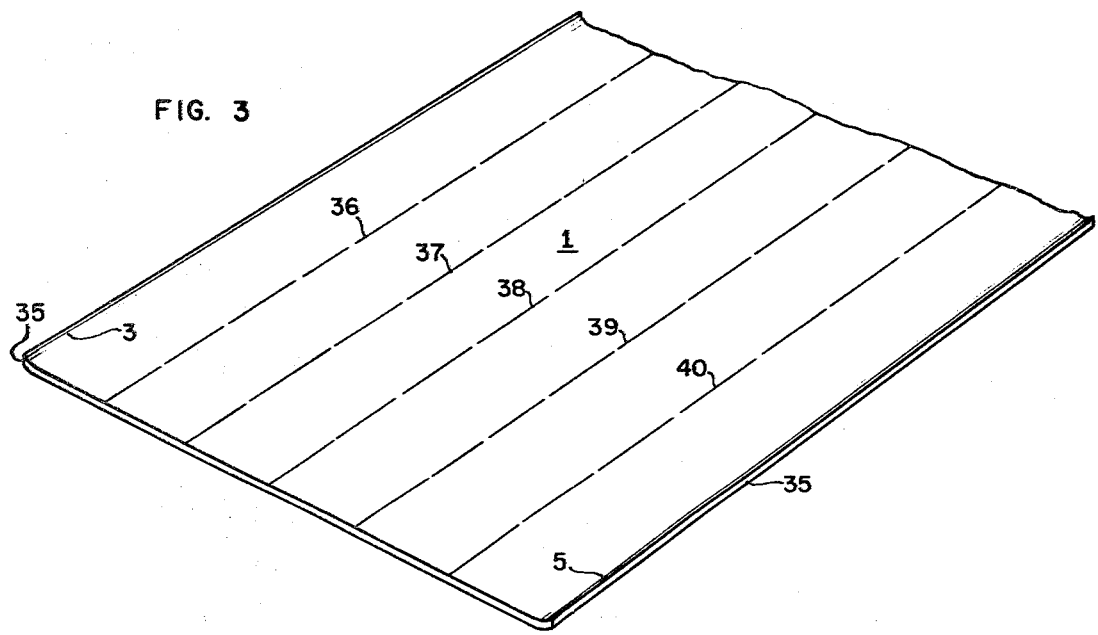
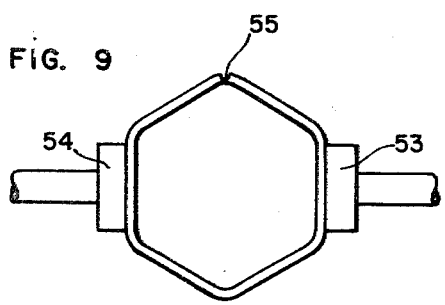
INVENTOR.
EUGENE W. PEARSON
BY
Edward Brosler
ATTORNEY

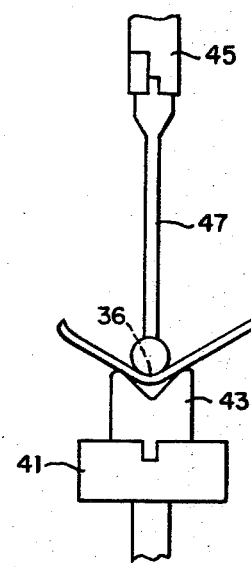
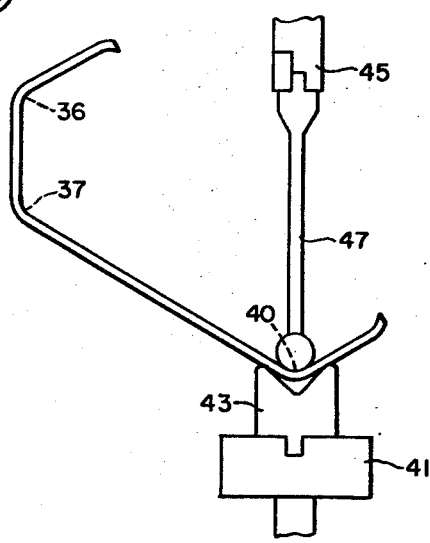
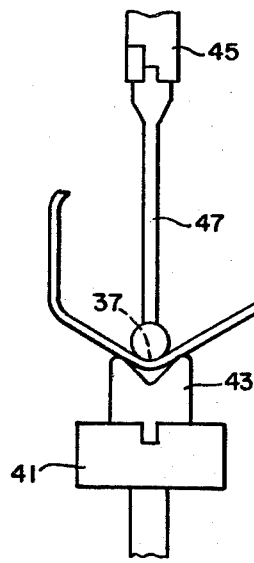
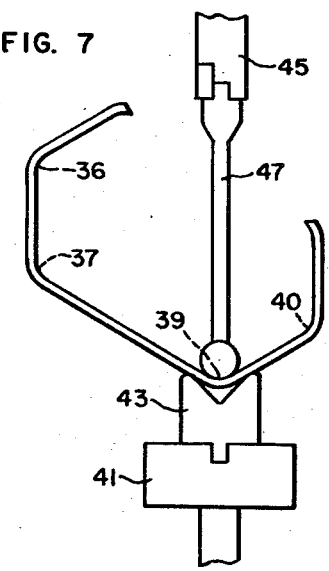
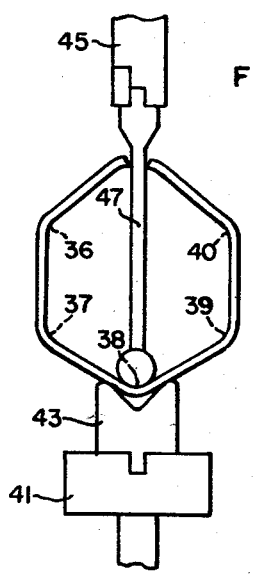
INVENTOR.
EUGENE W. PEARSON
BY Edward Brosler
ATTORNEY

United States Patent Office 3,606,671
Patented Sept. 21, 1971

3,606,671
METHOD AND APPARATUS FOR FORMING POLE-LIKE STRUCTURES
Eugene W. Pearson, Orinda, Calif., assignor to Pacific Press & Shear Corp.
Filed July 10, 1968, Ser. No. 743,693
Int. Cl. B23k 31/02
U.S. Cl. 29—477.7
5 Claims

ABSTRACT OF THE DISCLOSURE

A pole-like structure of polygonal section formed from a blank by first similarly bending and bevelling a pair of opposite marginal portions, forming a series of longitudinal bends in said blank intermediate said marginal portions, to bring said marginal portions toward each other to form a structure having an open seam at one corner, clamping the open seam structure under sufficient pressure to bring the marginal portions into substantial contact with each other to form a trough, welding the seam along the trough and shaping the welded corner to conform to the others.

---

My invention relates to the manufacture of pole-like structures and more particularly to a method and apparatus for forming hollow pole-like structures of polygonal section from metal plate.

Among the objects of my invention are (1) To provide a novel and improved method of forming a hollow pole-like structure of polygonal section;

(2) To provide a novel and improved method of forming a hollow pole-like structure of polygonal section from metal plate;

(3) To provide a novel and improved method of forming a hollow pole-like structure of polygonal section having arcuate corners;

(4) To provide novel and improved apparatus for forming a hollow pole-like structure of polygonal section.

Additional objects of my invention will be brought out in the following description of a preferred embodiment of the same, taken in conjunction with the accompanying drawings wherein, FIG. 1 is a view depicting the type of hollow pole-like structure contemplated by the present invention;

FIG. 2 is a view based on Richardson Pat. No. 3,176,389 and depicting a manner of carrying out certain steps involved in the method of the present invention;

FIG. 3 is a view in section of a blank with opposite marginal portions similarly bent and bevelled in accordance with FIG. 2;

FIGS. 4 through 8 are views of the pertinent elements of a press brake and die arrangement for imparting additional forming operations on the blank of FIG. 3, and illustrating the blank in positions for successive bending operations employed in forming the polygonal section of the desired pole-like structure; and FIG. 9 is a view depicting a subsequent step in the method of the present invention and the apparatus involved.

Referring to the drawings for details of my invention in its preferred form, the type of pole-like structure to which the method and apparatus relate, involves one having a polygonal section, preferably hexagonal, and in the preferred form, such structure will have arcuate corners and may well be tapered.

In forming such pole-like structure, a blank 1 is first prepared to a desired length and of a width exceeding the base perimeter of the structure. The opposite longitudinal marginal portions 3 and 5 of the blank are then similarly bent and bevelled, each bend being substantially arcuate and on a radius of curvature substantially corresponding to that of the arcuate corners desired in the finished structure. While the manner of bending and bevelling such marginal portions of the blank is not to the invention, the apparatus and method for performing such operations, disclosed in the patent to Rolland A. Richardson for Method Of Fabricating Cylinders From Heavy Metal Plate, No. 3,176,389 of Apr. 6, 1965, is admirably adapted for use in accomplishing these steps.

In accordance with such patent, both operations may be accomplished in one step through the application of a suitable forming plate 7 to a power shear 9 of a conventional type having a lower knife 11 including a shearing edge 13 and an upper angularly disposed knife 15 in a shearing relationship to the lower knife.

Such shear is provided with a work supporting table 17 terminating adjacent the lower knife, and hold-down means 19 usually in the form of a plurality of cylinders 21 and included pistons 23 spaced above and transversely of the table, the function of the hold-down means being to clamp work to the table to immovably hold the same while the shearing operation takes place.

The upper knife is mounted for vertical movement and is actuated preferably by hydraulic motors (not illustrated). The upper knife is preferably supported at a slight forward tilt angle.

The forming plate 7 has a planar bottom or lower side for resting on the planar surface of the table 17, and an upper side including a parallel planar surface 29 and a substantially arcuate surface 31 meeting the lower side along a relatively sharp straight edge.

The forming plate is disposed on the table with its sharp edge adjacent the shearing edge 13 of the lower knife. The plate or blank whose marginal portions are to be pre-formed and bevelled, is positioned on the forming plate with one end extending beyond and overhanging the lower knife and the hold-down means are then actuated to clamp the same to the table.

The overhanging end of the plate whose marginal portion is to be bent and bevelled, is thus supported in spaced relationship to the shearing edge of the lower knife, and consequently, as the upper knife is lowered, a pre-arcing of the marginal portion of the plate occurs before shearing can take place. This procedure is the reverse of that normally followed in prior art practice, and inasmuch as the upper knife will, of necessity, have to shear through plate material which lies at an acute angle thereto, a bevel 35 will be formed during such shearing.

Upon completing the arcing and bevelling of one marginal portion, the blank will be rotated to bring the opposite marginal portion into position for a similar arcing and bevelling, whereby the blank will take on the sectional appearance depicted in FIG. 3 of the drawings.

The blank as thus formed with its marginal portions arced and bevelled, is then bent along longitudinal lines intermediate the marginal portions, the number of such bends and the spacing therebetween being determined by the character of the polygonal section desired. Thus, for a hexagonal contour, five such intermediate bends along lines 36, 37, 38, 39 and 40 will be required to cause the bevelled marginal portions to approach each other at a corner of the polygon, and where the polygonal section desired is to be a regular hexagon, one such bend 38 should be along the medial line between the marginal portions, and the spacing between them should be equal. The radius of curvature of each such bend, though optional, will be the same for all bends and the curvature imparted to the marginal portions will be designed to substantially conform to the others.

In accomplishing such intermediate bends, a press brake is a very convenient tool for this purpose. A press brake basically involves a bed 41 upon which may be installed the female component 43 of a die set, and a press brake ram 45 to which may be assembled the male component 47 of such die set. For the present purpose, the female component may be a V-die, that is one having a V-shaped trough running lengthwise thereof, while the male component will terminate in a cylindrical edge having a radius of curvature such as will impart the desired corner curvature when metal of the desired thickness is partially depressed into the V-trough.

The intermediate bends along lines 36 and 37 to one side of the medial line are first made with the aid of the press brake, such operations being depicted in FIGS. 4 and 5, following which the blank is removed from the machine and reversed end to end to provide the bends to the opposite side of the medial line as illustrated in FIGS. 6 and 7.

Following these bending operations, the blank is positioned with the medial line in alignment with the dies and the medial bend then formed.

Preferably in this last operation, the degree of bend may be somewhat reduced, to avoid the probability of the bevelled edges engaging and clamping the male die between them, following which the structure thus formed, may be slid lengthwise from the male die. By undercutting the male die, such removal of the work will be facilitated.

The open seam structure resulting from the final bending operation, after removal from the press brake, is positioned between clamping jaws 51, 53 and clamped under sufficient pressure to bring the bevelled marginal portions into engagement to form a trough 55, such clamping in the meantime increasing the bend along the medial line to compensate for the incomplete bending previously described to permit removal of the open seam structure from the press brake.

While held in its clamped condition, the seam along the trough is welded, and the weld metal filling the trough is subsequently ground to a finish surface conforming to the curvature of the remaining bends.

Where the length of the pole-like structure is relatively short, the bending operations may be conveniently handled by conventional type press brakes of nominal size, but where the length may be substantial and beyond the capacity of the average single press brake to accommodate, a plurality of such press brakes may be operated in tandem as for example, in accordance with the disclosure in the patent to Rolland A. Richardson for Independently Operable Press Brakes Having Tandem Coupling Means, No. 3,393,635 of July 23, 1968.

When tandem operation of press brakes is not available, sections may be formed on the one press brake and welded together, end to end, toward arriving at the finished product. In such case, each section, from the view point of the present invention, may be considered a pole-like structure.

The ability to utilize press brake type machines in the forming of hollow pole-like structures, makes it conveniently possible to form such structures on a taper and to any degree of taper desired, simply by forming the longitudinal bends in a converging relationship to each other, in lieu of a parallel relationship which would result in a structure having a uniform cross-sectional area from end to end.

By forming the blank to locate the welded seam along a corner, many advantages are attainable over a procedure resulting in a welded seam along a flat surface of the structure.

In forming the structure with the weld along a flat side, it could conceivably become more feasible to make all bends in like manner, in which event, the required bevelling of edges would involve a separate bevelling operation, and the economies resulting from the combined arcing and bevelling step would not be available.

Furthermore, when welding occurs along a flat surface, any resulting distortion, due to the welding heat, will readily become apparent should the surface be covered with a high gloss paint or with a highly reflective surface coating such as aluminum.

Further, great care must be exercised in matching up the bevelled edges to assure as even a surface as possible.

When the structure is formed in the manner of the present invention, that is to bring the welded seam along a corner, minor variations from perfection are not critical, and many of these will automatically be removed by a simple form grinder, when employed in finishing up the corner to the proper curvature.

From the foregoing description of my invention in its preferred form, it will be apparent that the same fulfills the objects of my invention, and is furthermore subject to modification and alteration without departing from the underlying principles involved, and I, accordingly, do not desire to be limited in my protection to the specific details illustrated and described, except as may be necessitated by the appended claims.

I claim:

1. A method of forming a pole-like structure of polygonal section having arcuate corners comprising preparing a blank of a length and width sufficient to form the contemplated structure, similarly bending and bevelling each of the opposite longitudinal marginal portions of said blank to form on each, an arcuate rim of a curvature similar to the curvature of said arcuate corners and with a bevelled edge, forming a series of equally spaced longitudinal bends intermediate said longitudinal marginal portions, each along an arc corresponding substantially to the desired arcuate corners and with said bends so located as to bring the longitudinal marginal portions toward each other to form a partially completed open seam structure of polygonal section with said marginal portions approaching a corner of said polygonal section, clamping said partially completed open seam structure under pressure sufficient to bring said bevelling longitudinal marginal portions into substantial engagement with each other to form a trough between the bevelled edges thereof, and welding said structure along said trough.

2. A method of forming a pole-like structure of polygonal section in accordance with claim 1, characterized by forming said series of longitudinal bends in a press brake.

3. A method of forming a pole-like structure of polygonal section in accordance with claim 1, characterized by said marginal portions being arced to form a substantially arcuate corner of said polygonal section when said marginal portions are welded together.

4. A method of forming a pole-like structure of polygonal section in accordance with claim 1, characterized by said marginal portions and said intermediate longitudinal bends converging toward each other to form a tapered structure.

5. A method of forming a pole-like structure of polygonal section in accordance with claim 1, characterized by first forming longitudinal bends to one side of said medial line, then forming longitudinal bends to the other side of said medial line, and then forming a longitudinal bend along said medial line.

(References on following page)

References Cited

UNITED STATES PATENTS

| | | | |
|---|---|---|---|
| 3,039,414 | 6/1962 | Rosanes | 113—116 |
| 3,176,389 | 4/1965 | Richardson | 29—477 |
| 1,756,403 | 4/1930 | Thomson | 29—477.7X |
| 2,127,618 | 8/1938 | Riemenschneider | 29—477.7X |
| 2,311,138 | 2/1943 | Swartz | 29—477.7X |
| 2,618,845 | 11/1952 | Quarnstrom | 29—477.7X |
| 2,741,831 | 4/1956 | Johnson | 29—477.7 |
| 3,004,324 | 10/1961 | Macomber | 29—477.7X |
| 3,164,896 | 1/1965 | Fullman | 29—477.7X |
| 3,361,319 | 1/1968 | Sato et al. | 29—477.7X |
| 3,452,424 | 7/1969 | Morris | 29—477.7 |

JOHN F. CAMPBELL, Primary Examiner

R. B. LAZARUS, Assistant Examiner

U.S. Cl. X.R.

29—482